(12) United States Patent
Wolff et al.

(10) Patent No.: US 7,340,724 B2
(45) Date of Patent: Mar. 4, 2008

(54) EVALUATING EXPRESSIONS IN A SOFTWARE ENVIRONMENT

(75) Inventors: Adam G. Wolff, San Francisco, CA (US); David T. Temkin, San Francisco, CA (US); Oliver W. Steele, Brookline, MA (US); P. Tucker Withington, Plymouth, MA (US); Henry B. Minsky, Newtonville, MA (US)

(73) Assignee: Laszlo Systems, Inc., San Mateo, CA (US)

( * ) Notice: Subject to any disclaimer, the term of this patent is extended or adjusted under 35 U.S.C. 154(b) by 746 days.

(21) Appl. No.: 10/642,360

(22) Filed: Aug. 15, 2003

(65) Prior Publication Data

US 2005/0039165 A1    Feb. 17, 2005

(51) Int. Cl.
*G06F 9/44* (2006.01)
(52) U.S. Cl. .................. 717/117; 717/114; 717/141
(58) Field of Classification Search ................ 717/114, 717/117, 141
See application file for complete search history.

(56) References Cited

U.S. PATENT DOCUMENTS 5,860,010 A * 1/1999 Attal ........................ 717/137

OTHER PUBLICATIONS

Guy L. Steele, Common Lisp the Language, 2nd Edition, 1990, Thinking Machines, Inc, Digital Press, Section 5.3.3, pp. 1-15.*
Rodriguez et al., Active Lisp Pages, The International Lisp Conference, 2002, pp. 1-4, [online] 2002, [retrieved on Oct. 13, 2006]. Retrieved from the internet:< http://scholar.google.com/scholar?hl=en&lr=&q=cache:QAn98Khf150J:fresh.homeunix.net/files/ilc02/proceedings/andres-rodriguez.pdr+active+lisp+pages>.*
Hickey et al., LISP—a Language for Internet Scripting and Programming, 1998, pp. 1-20, [online] 1998, [retrieved on Oct. 13, 2006]. Retrieved from the internet: <http://citeseer.ist.psu.edu/cache/papers/cs/970/http:zSzzSzwww.cs.brandeis.eduzSz~timzSzPaperszSzlugm.pdf/hickey98lisp.pdf>.*
Haible et al., Impelmentation Notes for GNU CLISP, document in release 2.29 package, pp. 1-5, Jul. 31, 2002, [online] 2002, retrieved on Oct. 13, 2006]. Retrieved release 2.29 package from internet: <http://ftp.wayne.edu/pub/gnu/clisp/release/2.29/clisp-2.29-win32.zip>.*
Graham, et al., A Fast and Usually Linear Algorithm for Global Flow Analysis, University of California, Computer Science Division, pp. 22-34, 1976.

* cited by examiner

*Primary Examiner*—Tuan Dam
*Assistant Examiner*—Zheng Wei
(74) *Attorney, Agent, or Firm*—Vierra Magen Marcus & DeNiro LLP

(57) ABSTRACT

Code for a program is received by a compiler (or other entity). The code includes an expression for a variable and a marker that specifies when the expressions should be evaluated during execution of the program. Example markers can indicate that an expression should be evaluated immediately, once or always. Additional functionality is provided to the code in order to evaluate the expression at the specified time during execution of the program. If the expression is to be evaluated always, then the expression will likely be dependent on a item that can change. Functionality is provided that evaluates the expression when the item changes so that the variable can be updated.

33 Claims, 5 Drawing Sheets

EVALUATING EXPRESSIONS IN A SOFTWARE ENVIRONMENT

BACKGROUND OF THE INVENTION

1. Field of the Invention

The present invention is directed to technology for evaluating expressions.

2. Description of the Related Art

The specification of a computer program (e.g., source code) includes expressions that can be evaluated at different times, including expressions that should be evaluated when a program is compiled and expressions that should be evaluated when the program is executed. Many program languages use the same syntax to describe expressions that should be evaluated when a program is compiled and expressions that should be evaluated when a program is executed. In these languages, the syntactic context of the expression determines the expression's evaluation time. Macros, inlined functions, staged programming, templates, and compile-time specialization are standard for achieving this effect. The Common Lisp eval-when construct specifies whether an expression should be evaluated when the program is compiled or when it is loaded. These solutions control whether an expression is evaluated when a program is compiled or when it is executed.

Event-driven evaluation is typically achieved by placing an expression in different syntactic context depending on when it should be evaluated. An expression inside a function can be evaluated multiple times, once each time the function is called. An expression in the initializer of a global variable is executed once when the program is loaded. To use the first syntax to cause reevaluation in response to an event, the expression is wrapped in a function definition and the function is registered as an event handler. This is verbose and makes it hard to express this portion of a program's design. It creates a syntactic distinction between two very similar specifications, such that a minor change in the specification can lead to large changes in the design. Furthermore, it creates a disincentive to use designs that call for expressions that are re-evaluated.

For example, a value is defined in JavaScript as follows:

view.width=100;

Here's the code that access that value. This code reads the value, adds ten to it, and binds a variable 'mywidth' to it:

var mywidth=view.width+10;

To have this value initialized immediately, when the program is loaded, the function F that contains the line "view.width=100" should be called once when the program is loaded. To change the program so that the value is initialized at a later time, the call to F should be moved to a location that is called later. Making this change requires global program analysis to inspect when F is called, when its caller F' is called, and so on. It may also require refactoring the program.

For example, if F contains the lines:

view.x=10;

view.width=100;

and it's necessary to make the initialization of view.width occur at a different time from the initialization of view.x, then F needs to be split into two functions, F0 which initializes view.x (and other variables that should be initialized at the first time), and F1 which initializes view.width (and other variables that should be initialized at the later time). Then the programmer must find a location in the source text at which to insert a call to F1. As can be seen, existing means to control the timing for evaluation for an expression is not sufficient.

The specification of a computer program also generally includes a set of relations between variables. For example, in procedural programming languages such as C, Java and JavaScript, these relations are encoded as statements that compute the values of expressions and reassign values to variables based on the computations. Ensuring that a variable is updated when a depended on value changes requires manual coding, and is verbose and error prone.

The Eiffel programming language, the Z assertion language, and extensions to Java such as iContract, allow the programmer to attach equation descriptions of invariants to program constructs. These are used to check the behavior of the program, but cannot automatically trigger the execution of update routines.

The Listener design pattern, created in the context of the Smalltalk, Model-View-Control architecture, standardizes a pattern for broadcasting notifications that a value has changed, and registering code that is executed when a notification is received. The sending of notifications, and the construction of update code that is executed when a notification is received and code that registers this update code is manual, verbose and error prone.

Some logic programming languages and constraint systems, such as Prolog, EQL, Ops5, and the Screamer extensions to Common Lisp have "logic variables." A logic variable allows the expression that is used to compute the value of a variable to be placed in the source text next to the name of the variable, but evaluated when the values of the terms used in the expression are known. The expression is evaluated once, when the values of all the terms are bound (or initialized). Once a logic variable is bound to a value, its value never changes. These systems that use logic variable require either an execution engine with built-in support for logic variables, or a pre-processing stage where each expression in the program is replaced by a less efficient expression that deals with the possibility of logic variables. The first approach doesn't work for existing mainstream execution engines such as the Java Virtual Machine. The second approach is expensive both in computation time and the efficiency of the compiled program.

Thus, there is a need to provide a more useful and efficient means for identifying when an expression should be evaluated during execution and for implementing dependent relations between variables whose consistency is necessary for program correctness.

SUMMARY OF THE INVENTION

The present invention, roughly described, pertains to technology for evaluating expressions.

In one embodiment, code for a program is received by a compiler (or other entity). The code includes an expression for a variable and a marker that specifies when the expressions should be evaluated during execution of the program. One example of a marker indicates whether an expression should be evaluated immediately, once or always. Changing the evaluation time of an expression can be accomplished by changing the marker without moving the expression to a different position in the source code. Additional functionality is provided to evaluate the expression at the specified time during execution of the program. If the expression is to be evaluated always, then the expression will likely be dependent on an item that can change. Functionality is provided that will evaluate the expression when the item changes so that the variable can be updated.

One embodiment includes receiving code for a program, where the code includes one or more expressions and one or more markers that specify when the one or more expressions should be evaluated during execution of the program. Additional functionality is automatically provided to the code. The additional functionality evaluates the one or more expressions during execution of the program at times specified by the one or more markers.

In one embodiment, the markers indicate whether a variable should be evaluated "immediately", "once" or "always." One set of embodiments of the present invention improves over the prior art by making the timing of expression evaluation a local syntactic distinction, such that changing the evaluation time does not require global changes or refactoring of the program. For example, the following program defines an object whose x property is computed when the program is loaded, and whose width property is computed when the object is instantiated:

```
<view x="$immediately{10}" width="$once{100}"/>
```

To change both properties to be evaluated at the later time, the word "immediately" is changed to "once" rather than reorganizing the source code or making other global changes:

```
<view x="$once{10}" width="$once{100}"/>
```

Another embodiment includes receiving existing code that includes an expression defining a first variable or property, where the expression is dependent on a changeable item (e.g. variable, property, etc.). Additional functionality is provided that evaluates the expression when the item changes in order to update the first variable.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices, peripherals and/or communication interfaces.

These and other objects and advantages of the present invention will appear more clearly from the following description in which the preferred embodiment of the invention has been set forth in conjunction with the drawings.

DETAILED DESCRIPTION

A syntactic mechanism is introduced for specifying evaluation time of an expression independent from the context of where the expression is used (e.g., independent of its location in the source code). The expression is annotated with a marker that specifies the evaluation time. Changing the expression to a different evaluation time involves changing only the value of the marker, not moving the expression to a different position in the source code of the program. More details will be explained below.

Figure 1:
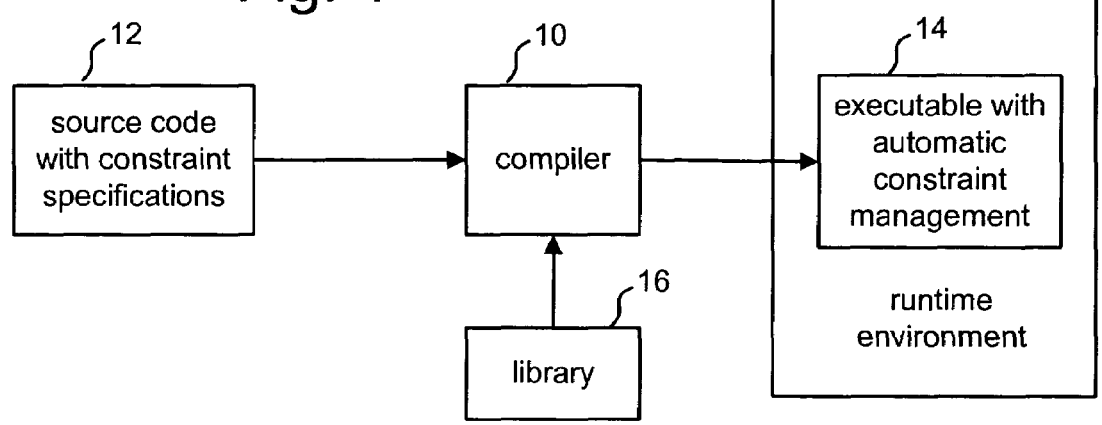
FIG. 1 is a block diagram of one embodiment of a system that evaluates expressions.

FIG. 1 is a block diagram depicting one embodiment of a system that can implement the new syntactic mechanism. FIG. 1 depicts a compiler 10 which receives source code 12 and library code 16. Source code 12 includes expressions for defining the values of variables (e.g., X=Y+10). Compiler 10 compiles the source code and adds all or a portion of library code 16 to source code 12. In various embodiments, library code 12 can be linked, compiled into, associated with or otherwise added with source code 12. In one embodiment, compiler 10 adds new functionality to source code 12 without using a library. The result of the compilation is executable code 14, which includes automatic expression evaluation management, as discussed below. Executable code 14 will be operated in a runtime environment. One example of a runtime environment includes the Macromedia Flash Player for running executable code 14, with executable code 14 being in the SWF file format. Other runtime environments can also be used.

Compiler 10 can receive code in various different programming languages. In one embodiment, compiler 10 receives a mark-up language description, for example, an XML-based language description. In one example implementation, a suitable XML-based language description can be used for designing and providing a user interface on a computing system. Other systems can also be implemented. One example of an interface is described in U.S. patent application Ser. No. 10/092,360, "Interface Engine Providing A Continuous User Interface," filed on Mar. 5, 2002, incorporated herein by reference in its entirety.

In one example implementation, the interface is made up of a series of views. A view is a representation/description of a displayable object (e.g., windows, buttons, sliders, etc.). Views have attributes and attribute modifiers. Attributes define properties of a view, for example, a view's appearance, sound and operation. Attribute modifiers alter attributes in response to events, such as a user input or a change of another attribute for that view or another view. Examples of attribute modifiers include layouts, animators, and constraints. Layouts are used to alter the view's child views. Animators are used to animate the view's appearance.

A constraint is an expression that is evaluated repeatedly, when its value changes, such that the property that is bound to it is maintained at the current, rather than the initial, value of the expression. A constraint is a means for keeping an attribute set to a certain value. Constraints state that a particular property of an object should be equal to some function of another property or properties of the system. If any of those other properties change, the constraint updates itself. A constraint can be based on any property, variable, parameter etc. of a system. Examples include constraints that are dependent on mouse position, windows, data in a data set, etc. A constrain can be used to constrain a property, variable, etc.

The form of an attribute is: (attribute name) =$time{expression}, where "expression" is some type of expression that is used to set the value of the attribute and "$time" is a marker that indicates when the expression should be evaluated. There are various values that can be used for "time." In one embodiment, "time" can indicate "immediately," "once," or "always." If the "time" is indicated to be "immediately," then the system will initialize the attribute to the value of expression when the enclosing element is defined. In one implementation the value should be a constant expression and should not depend on any other objects. In one option, "immediately" is the default value for "time." If "time" indicates "once," then the system initializes the attribute to the value of expression when the enclosing element is initialized (or instantiated). In one implementation the expression should not depend on being evaluated in any particular order with respect to other attributes. If "time" indicates "always," then the system updates the attribute any time the value of the expression changes. That is, the attribute is said to be constrained to the value of expression. In one embodiment, a developer can use a shortcut of "${expression}" to be the same as "$always{expression}."

In other embodiments, other values for "time" can be used. For example, "once" can further be specified to a particular time such as "once@2 s," which would evaluate the expressions two seconds after execution begins. In another embodiment, "always" can be used as a polling frequency. For example, "always@100 ms" would cause the expression to be evaluated at every 100 ms, rather than when a dependency changes. In one such implementation, a clock function is set up with a list of all constraints and the period for updating. At each relevant time period, the appropriate expressions are evaluated. In such an embodiment, the dependencies would not need the pointer to the functions described herein.

In another embodiment, dependency analysis can be performed at compile time so the code emitted for setting an antecedent knows exactly how to modify all dependents. For example, if there is an expression x="${f(y)+z}" the setter for z (a function for updating the value for z) could be:

```
setZ (new) { var old = z; z = new; x += new – old; }
```

This would be an optimization if the expression for x is complex and/or expensive, but the dependence on z is straightforward.

In one embodiment, if the marker includes a "$", but does not specify "immediately," "once," or "always," then "always" is assumed. If the expression does not specify a marker, including not using a "$" then "immediately" is assumed. Attributes with "$always" are constraints.

In one embodiment of an XML-based source language, the enclosing tag of an application is the canvas element. The canvas element is a view. For example:

```
<canvas>
    [application]
</canvas>
```

Below is source code for a first example of an XML-based language application that uses one embodiment of the present invention:

```
<canvas>
    <view bgcolor="red" width="20" height="20" id="refview"
        onclick="this.animate( 'width', 10, 1000, true )"
        />
    <view bgcolor="blue" width="10" height="20"
        x="$immediately{refview.width}"/>
    <view bgcolor="yellow" width="10" height="20"
        x="$once{refview.width}"/>
    <view bgcolor="gray" width="10" height="$immediately{20}"
        x="$always{refview.width}"/>
</canvas>
```

The above code creates four objects for a user interface. Each object is a view; therefore, the code shows four views. The first view is a red rectangle that initially has a width of 20 pixels, a height of 20 pixels, and an ID of "refview." When the rectangle is clicked by a mouse or other pointing device, the width will be animated to increase. A second view is a blue box having a width of 10 pixels and a height of 20 pixels. The x coordinate of the box (the x attribute) has a marker equal to "immediately." Therefore, the expression "refview.width" will be evaluated when the enclosing element is instantiated. The expression defines x to be equal to the width of the object identified as refview. A third view is a yellow box having a width of 10 pixels and a height of 20 pixels. The x position of the box has an attribute with a marker indicating "once." Therefore, the attribute is initialized to the value of expression when the enclosing statement is initialized. The expression defines x to be equal to the width of the view identified as refview. The fourth object is a gray box having a width of 10 pixels and a height of 20 pixels. The x coordinate, defined by the x attribute, has a marker equal ton "always." Therefore, any time the width of refview (the red box) changes, the x coordinate will also change.

When the above source code is executed, the four objects will initially be displayed on a screen. The blue box will have an x coordinate of zero since the expression was evaluated before the red box was implemented. The yellow box will have an x value equal to the initial width of the red window, which is 20. The gray box will have an initial x position equal to the initial width of the red window, which is 20. As the red window is clicked, the red window will expand its width causing the gray box to change its x position. Thus, the x position of the gray box will continuously track the width of the red rectangle, as the red rectangle grows in width.

Below is source code for another example of an XML-based language application that uses an embodiment of the present invention:

```
<canvas>
    <button x="20" y="$always{20 + this.x}"
        onclick="this.setAttribute( 'x', this.x + 10 )">
    </button>
    <view id="redguy" bgcolor="red" width="10" height="width"
        y="parent.getMouse('y')"/>
        <view bgcolor="blue" width="slider.sliderVal" height=
        "width" />
    <view bgcolor="gray" y="100" x="100" width="200" id="slider">
        <attribute name="sliderVal" value="$always{thumb.x}"/>
        <view bgcolor="blue" width="10" height="15" name="thumb"
            onmouseup="this.dragstate.remove( )"
            onmousedown="this.dragstate.apply( )" >
            <state name="dragstate">
                <attribute name="x" value="$always{parent.
                getMouse('x')}"/>
            </state>
        </view>
</canvas>
```

The above example creates four items on a user interface. The first item described is a button having an x coordinate of 20 and a y coordinate that is 20 pixels greater than the x coordinate. For example, if the x coordinate is 20, then the y coordinate is 40. This button has a property so that when clicked, the x coordinate is increased by 10. Note that y coordinate includes a constraint. That is, there is an expression that the y coordinate is equal to 20 plus the value of the x coordinate and there is a time marker indicating "always." Thus, whenever the x coordinate changes (the expression is dependent on the x coordinate), then the expression will be reevaluated and the y value will be updated.

The second item described by the above source code is a red square having a width equal to 10 pixels and a height equal to the width. The y coordinate of the square tracks the y coordinate of the mouse within the canvas. The third element described in the source code is a blue square. The height of the blue square is equal to the width of the square. The width is equal to a variable called "slider.sliderVal." Note that there is no marker for the width; therefore, the default is "immediate." The value "slider.sliderVal" is defined below.

The fourth element described in the above source code is a slider which includes a gray rectangle and a blue rectangle within a gray rectangle. The blue rectangle can slide in the x direction when the mouse drags it. The gray rectangle has a y coordinate of 100, an x coordinate of 100, a width of 200 pixels, and is identified by the name "slider." An attribute is created with a name "sliderVal." This attribute has a value defined by the expression "thumb.x." Note that the value also has a marker indicating "always." The expression "thumb.x" will be described below. The gray rectangle has a subview (or sub element) which is the blue rectangle. The blue rectangle has a width of 10 pixels, a height 50 pixels and a name equal to "thumb." Thus, the expression "thumb.x" refers to the x coordinate of the blue rectangle named "thumb." The rectangle name "thumb" has two specified events. The two events occur on mouse up and mouse down. Mouse down is when the user positions the mouse over the box and clicks on the mouse button. Mouse up is when the user lets go of the mouse button. The above source code defines a state name "dragstate." This state has an attribute "x" set to the expression "parent.getMouse ('x')." That expression has a marker equal to "always." Thus, the attribute x for drag state will continuously be updated to the x position of the mouse within the gray rectangle labeled as "slider." Therefore, while the mouse down event is occurring (the mouse button is pushed), the x value of "thumb" will be continuously updated. Upon a mouse up event (the user stops pushing down the mouse button), the x value of "thumb" will no longer be continuously updated. Note that the system has a means for declaring the dependencies for the function getMouse, and that is why the constraint is updated.

Figure 2:
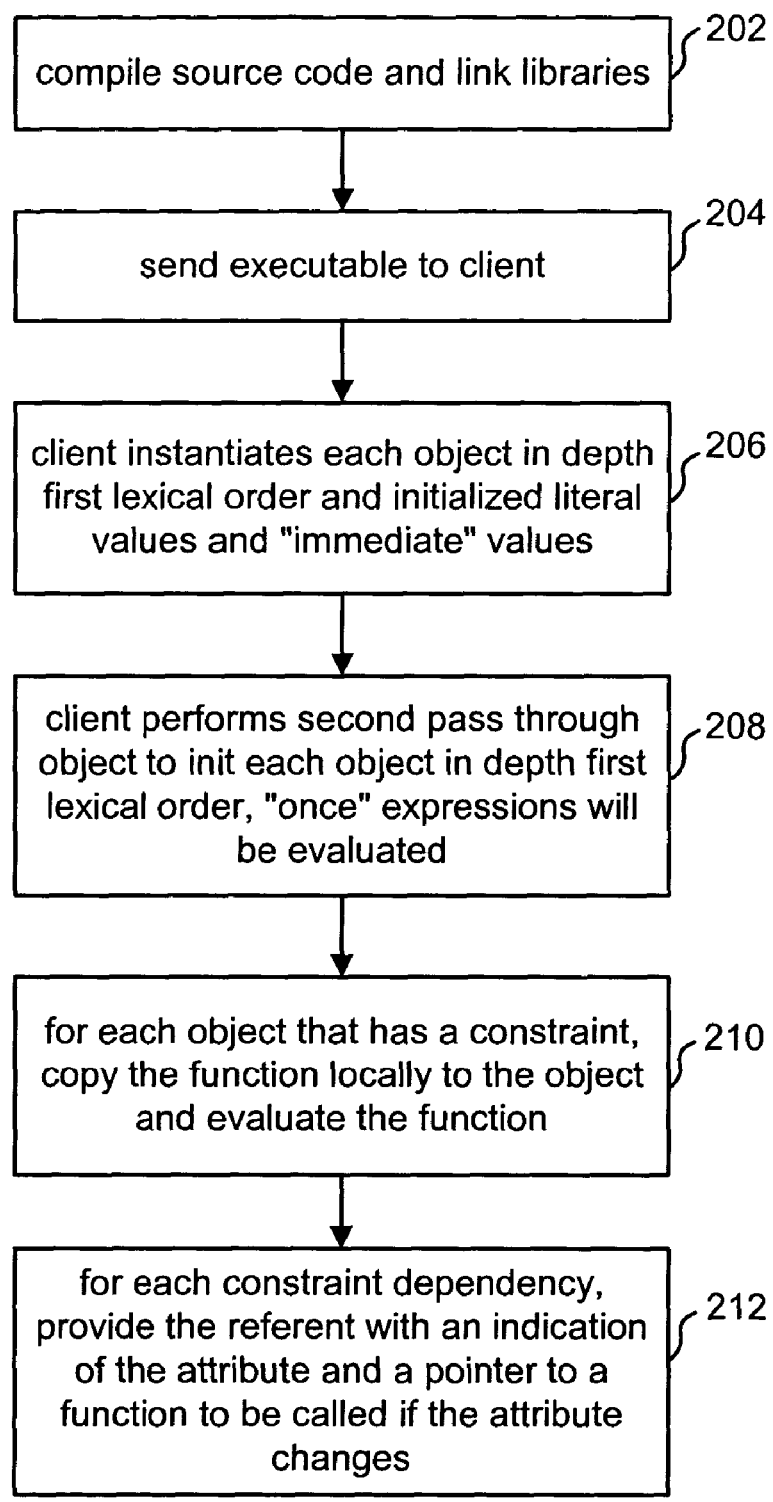
FIG. 2 is a flow chart depicting one embodiment of a process for operating a system that evaluates expressions.

FIG. 2 is flow chart depicting one embodiment of a process for operating a system that can evaluate expressions, as described above. In step 202, compiler 10 (or another entity) receives source code 12 (e.g., an XML mark-up language source code or other type of source code) and compiles the source code. In one embodiment, the compilation of source code includes linking one or more libraries 16, or otherwise adding additional function to the original preexisting code.

Figure 3:
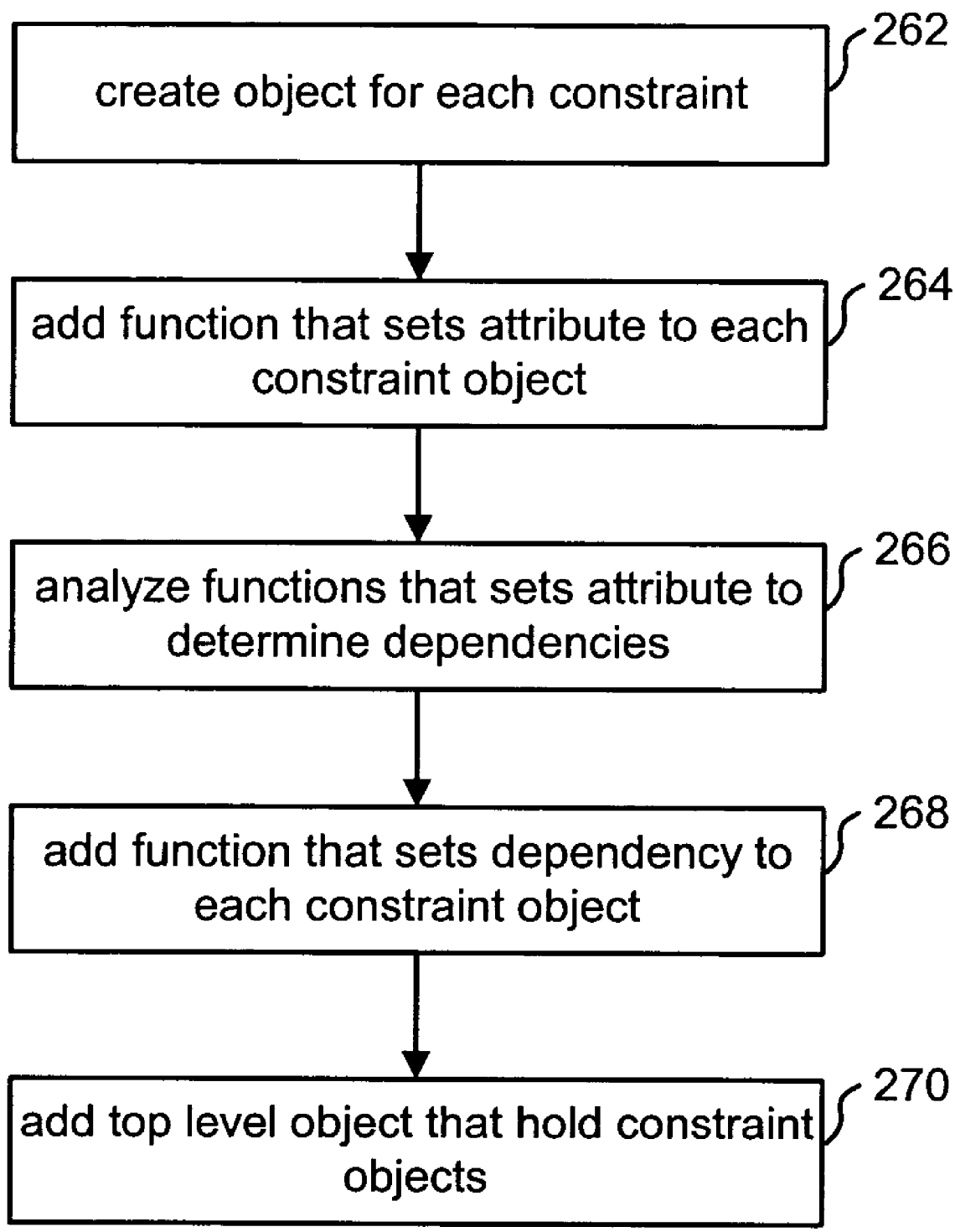
FIG. 3 is a flow chart depicting one embodiment of a process performed when compiling code.

FIG. 3 is a flow chart describing one embodiment of a portion of a process for compiling the source code. For each constraint (variable/attribute with an "always" marker), an object is created in step 262. Two functions are added to those objects. In step 264, a first function is added to each object that sets the attribute. This function includes the expression defining the value of the attribute. In step 266, the first function added in step 264 is analyzed to determine dependencies. That is, any variables or functions within the expression for which the expression determination is dependent on are identified. For example, the expression "x=y+ sine(q)" is dependent on the variable x and the function sine(q). In one embodiment, the identification of dependencies is analogous to data-flow analysis. Data-flow analysis is a basic compiler technique that is known in the art and is used to discover dependencies between variables and re-order instructions for better performance. One example of data-flow analysis is found in S. Graham and M. Wegman. "A Fast and Usually Linear Algorithm for Global Flow Analysis". Journal of the ACM, 23(1):172-202, January 1976, incorporated herein by reference. Other means for determining dependencies can also be used. In step 268, a second function called a dependency function is added to the constraint objects that returns the dependencies. The dependencies can include variables (e.g., attributes) or other functions. The dependency function returns the variable and analyzes the functions that are dependencies in order to determine what variables (e.g., attributes) are ultimately being depended on. The dependency function returns a set of values, including an identification of an attribute that is being depended on and an identification of the object owning that attribute. This set of values returned by the dependency function includes such values for each attribute that are dependencies and for attributes that are ultimately being depended on by functions that are dependencies. In some cases the dependency function will call other dependency functions (or other types of functions) to acquire the attributes for nested functions. In step 270, a top level object is created. Each of the constraint objects created in steps 262-268 are added to the top level object. In one embodiment, some or all of the additional functionality added during the process of FIG. 3 is from or based on library 16.

Here's an example of dependency functions. An expression a.b+c.d will depend on the 'b' property of the object that 'a' refers to, and the 'd' property of the object that 'c' refers to. It will compile to a function that evaluates the constraint: function ( ) {return a.b+c.d} and a function that returns a list of dependencies [(a, 'b'), (c, 'd')] where each element of the list is a pair of a reference to the basis of a property reference, and the name of the property that is referenced: function ( ) {return[(a, 'b'), (c, 'd')]}

The above handles constraints on property values. This elaboration handles constraint on variable values, such as in a+b. If an identifier is used in a context in which it is looked up in namespaces bound to this, local1, local2, and global, then the dependency function would return a pair (namespace, identifier) for each of these. For example, the dependency function for a+b would return: [(this, 'a'), (local1, 'a'), (local2, 'a'), (global, 'a'), (this, 'b'), (local1, 'b'), (local2, 'b'), (global, 'b')]

An elaboration handles constraints on functions. Each function f that is used in a constraint is given a property f.d whose value is a function that when called with the arguments of f, returns the dependencies for the value that F returns. For example, if f is the function: function f(a, b) {return a.x+b.y+c}then: f.d=function (a, b) {return [(a, 'x'), (b, 'y'), (global, 'c')]}. The dependency function for an expression that contains a call to f, contains a call to the dependency function of f. The value that this function returns is concatenated with the dependencies that analysis of the constraint expression itself reveals. For example, a constraint expression f(p,q)+a.z would have the dependencies function: function ( ) {return [(a, 'z')]+f.d(p,q)} which would evaluate to [(a, 'z'), (p, 'x'), (q, 'y'), (global, 'c')], but without requiring global analysis of the program when it is compiled.

In one embodiment, the invention as described works in the case of a property that is constrained to a.b, but not in the case of a property that is constrained to the value of a.b.c (or any term that includes a.b.c). (a.b.c denotes the 'c' property of the value that is referenced by the 'b' property of the value that is referenced by the object that is referenced by the variable 'a'.) It will work if the value of the 'c' property of a.b changes (this is one way in which the value of a.b.c can change), but it won't work if the 'b' property changes. (This is another way in which the value of a.b.c can change. If the 'b' property has the value obj1, and is changed to obj2, then a.b.c will change its reference from obj1.c to obj2.c. If obj1.c!=obj2.c then the value of the expression will change.)

The reason it won't work is that if when the dependencies are register the value a is obj0 and the value of a.b is obj1, then the dependencies will be registered as the 'b' property of obj0 and the 'c' property of obj1: [(obj0, 'b'), (obj1, 'c')]If a.b changes value, then the constraint triggers and the expression is reevaluated. However if obj2.c changes, then the constraint doesn't trigger because the (obj2, 'c') isn't on the list of dependencies for the expression.

The enhancement is to generate two lists for each expression. The first list is a list of dependencies, the same as in the existing algorithm. The second list is a list of metadependencies. These are references to properties whose values either the first or the second list (the list of metadependencies itself) depend on. For example, the expression a.b.c would have the dependencies: [(a.b, 'c')] and the metadependencies: [(a, 'b')].

The expression a.b.c.d+e.f.g would have the dependencies and meta-dependencies:

[(a.b.c, 'd'), (e.f, 'g')]

[(a.b, 'c'), (a, 'b'), (e, 'f')]

In the first example, if the 'c' property of the object that a.b referenced when the dependency function was executed changes, the constraint expression is reevaluated. If the 'b' property of the object that is referenced when the dependency function was executed changes, the lists of dependencies and metadependencies are recomputed with the new values for a and a.b, and these dependencies replace the list of dependencies that was collected when the dependency function was first executed.

These examples both ignore changes to the variables a and e themselves, and just illustrate dependencies on properties. In the implementation without metadependencies, the dependency list for an expression that referenced the variable a (either by itself or as the base for a property reference such as in a.b) would include [(globals, 'a')], where globals is a representation of the global variable namespace. If a constraint expression is evaluated in a context in which variable identifiers are looked up in other lexical scopes such as this, local1, local2, then the dependency list would include [(this, 'a'), (local1, 'a'), (local2, 'a'), (globals, 'a')]. With metadependencies then any variables which were only used as the basis for a property reference, a.b.c would appear only in the metadependencies, not the dependencies. For example, a.b would have dependencies [(a, 'b')] and metadependencies [(this, 'a'), (globals, 'a')].)

Looking back at FIG. 2, after the source code is compiled in step 202, the executable code created by the compiler is sent to the client. In some embodiments, the client can be on the same machine as the compiler. In other embodiments, the compiler can be on a central server and the client can be on a remote machine that is in communication the server via a network (e.g., the Internet). In other embodiments, the client includes the compiler. When the client receives the executable code (e.g., object code), the client executes the object code. Steps 206-212 of FIG. 2 are performed at the beginning of the execution phase. Subsequent to step 212, the program's logic will be performed.

In step 206 of FIG. 2, after loading the executable, the client instantiates each object in depth first lexical order. In other embodiments, other orders can be used. As described above, each item in a user interface will be represented by an object. For example, in one implementation, each item is a view and each view will be represented by a view object. Each of those objects are instantiated in step 206. Additionally, in step 206, all literal values and immediate values are initialized. An immediate value is an expression which has a marker that indicates it is to be evaluated immediately.

In step 208, the client performs a second pass through all the objects to initialize each object in depth first lexical order. In other embodiments, other orders can be used. Any expression which has a marker indicating "once" will be evaluated in step 208, and the associated variables will be updated accordingly.

Steps 210 and 212 are performed for each expression that has a marker indicating "always." These are the constraints that need to be updated continuously. In step 210, for each object that has a constraint (e.g., expression indicating "always"), the first function that evaluates the expression is copied locally to the object and that function is evaluated. For example, if a particular view has an attribute which includes a constraint, the object for that particular view receives a method implementing the function for the expression. In step 212, for each constraint dependency noted by the second function in the constraint objects, the referent (the object who owns the variable or function that is the dependency) is provided with an indication that the particular attribute or function is a dependency. The referent is also provided with a pointer (or reference) to a function. The function that is the result of the pointer (or reference) is to be called by the referent if the attribute which is the dependency changes. In one embodiment, each view has an event that corresponds to the each attribute. For instance, for the x attribute described above, there is an "onx" event. This event occurs when the x attribute changes. The event is stored in memory. When an object that is a referent receives an indication that a particular attribute is a dependency, the event for that attribute will store the pointer. When the attribute changes, the event will then call the pointer which invokes the function. The invoked function, which is the function copied in step 210, causes the expression to be reevaluated. The code that performs steps 206-212 is added to the original program by the compiler in step 202. Some or all of that code could be from library 16.

Figure 4:
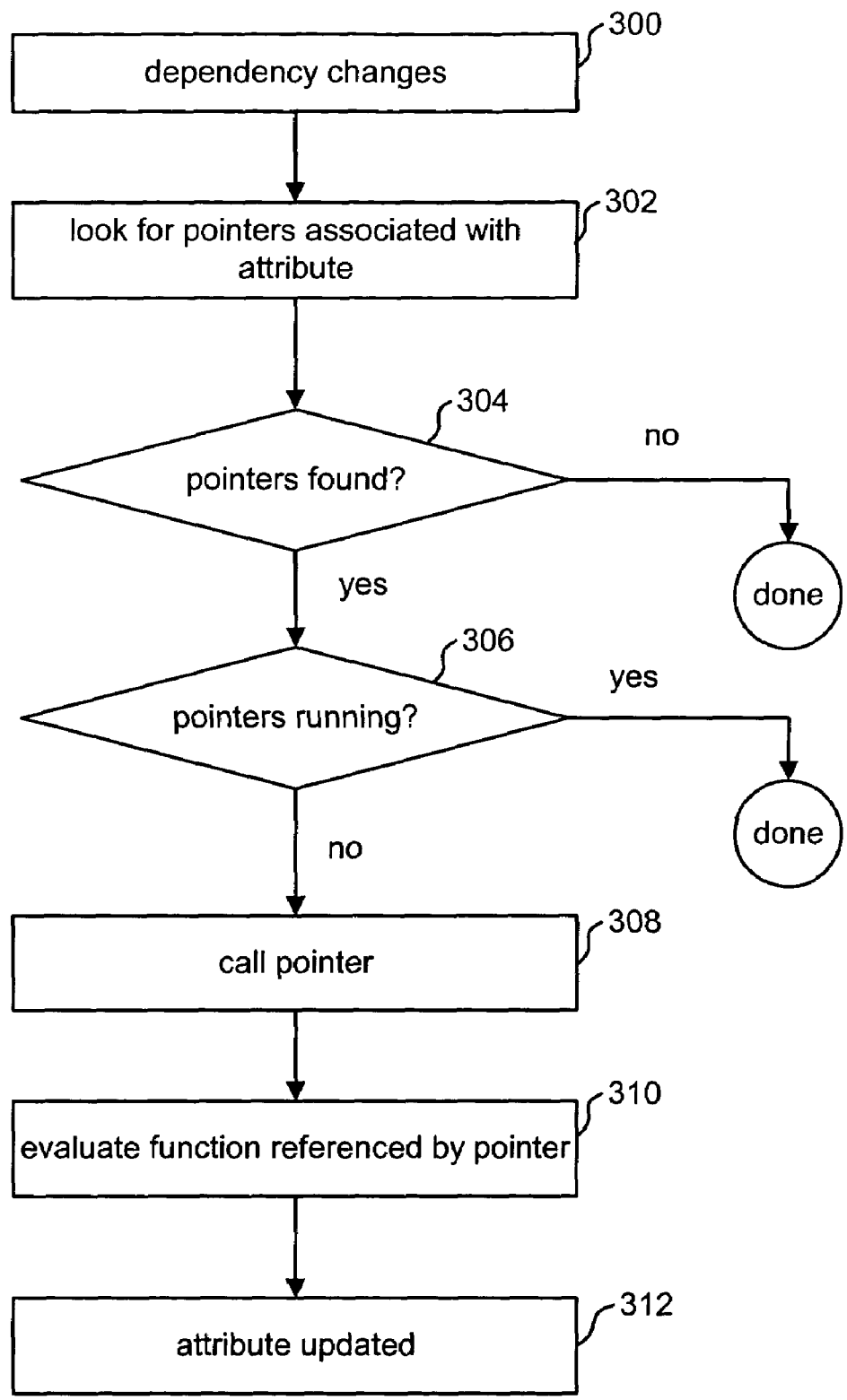
FIG. 4 is a flow chart depicting one embodiment of a process performed while executing code.

After the process of FIG. 2 is complete, the client will begin executing the main logic of the program. If, during that execution, any of the attributes which are dependencies (or any other dependencies) change, the process of FIG. 4 is performed. The code that performs the process of FIG. 4 is added by the compiler in step 202. Some or all of that code could be from library 16. In step 300, the attribute (or other dependency) changes. In step 302, the event for that attribute (or other dependency) determines whether there are any pointers associated with that attribute. If there are no pointers found then the process of FIG. 4 is complete. If there are pointers found, then in step 306, it is determined whether the pointer is already running. If the pointer is already running, the process of FIG. 4 is complete. If the pointer is not running, then in step 308 that pointer is called. In step 310, the function referenced by the pointer is performed and the expression within that function is evaluated. In step 312, the attribute associated with the function is updated according to the new value of the function.

Note that it is possible that there can be circular dependencies. One attribute can be dependent on a second attribute and the second attribute can be dependent on the first attribute. To prevent the system from entering into a continuous loop, step 306 is used to see whether a pointer is already running. If a first pointer causing a first expression to be evaluated, causes a new pointer to be called for the new value associated with the expression, that first pointer will continue running until the chain of functions called by the pointers (nested dependencies) finish operation. Thus, if there is a circular dependency that goes back to the original pointer, the original pointer will not be called again. That is, in step 306, if the original pointer was already running, it will not be called again and the chain of function calls will end at that point. In other embodiments, the system may allow a number of iterations for circular updating (possibly at fixed intervals) prior to locking. In yet another embodiment, the compiler can look for circular dependencies, and report an error if a circular dependency is found.

Note that in one embodiment, the processes of FIGS. 2-4 are performed by computers or other machines in an automated fashion, rather than being performed by a human. Thus, a software developer creating source code 12 need not write code to implement the processes of FIGS. 2-4. Rather, the functionality described in FIGS. 2-4 is added by compiler 10 (or another entity).

One example of an implementation of the system of FIG. 1 that evaluates expressions as described herein includes a Presentation Server that can be used to provide content to a client via a network (e.g., via the Internet). The Presentation Server is designed to receive a mark-up language description of a user-interface and dynamically compile that mark-up language description to executable code. In one environment, the mark-up language description is an XML-based language that is designed specifically for describing an application's user interface, along with the connection of that user-interface to various data sources and/or web services. It contains standard user interface primitives like "window," "button," "text," "scroll bar," and so on, as well as syntax for automatically connecting user-interface items with back-end data sources and services. The mark-up language can also include a scripting language for procedural specification of application behavior that is similar to Javascript.

Figure 5:
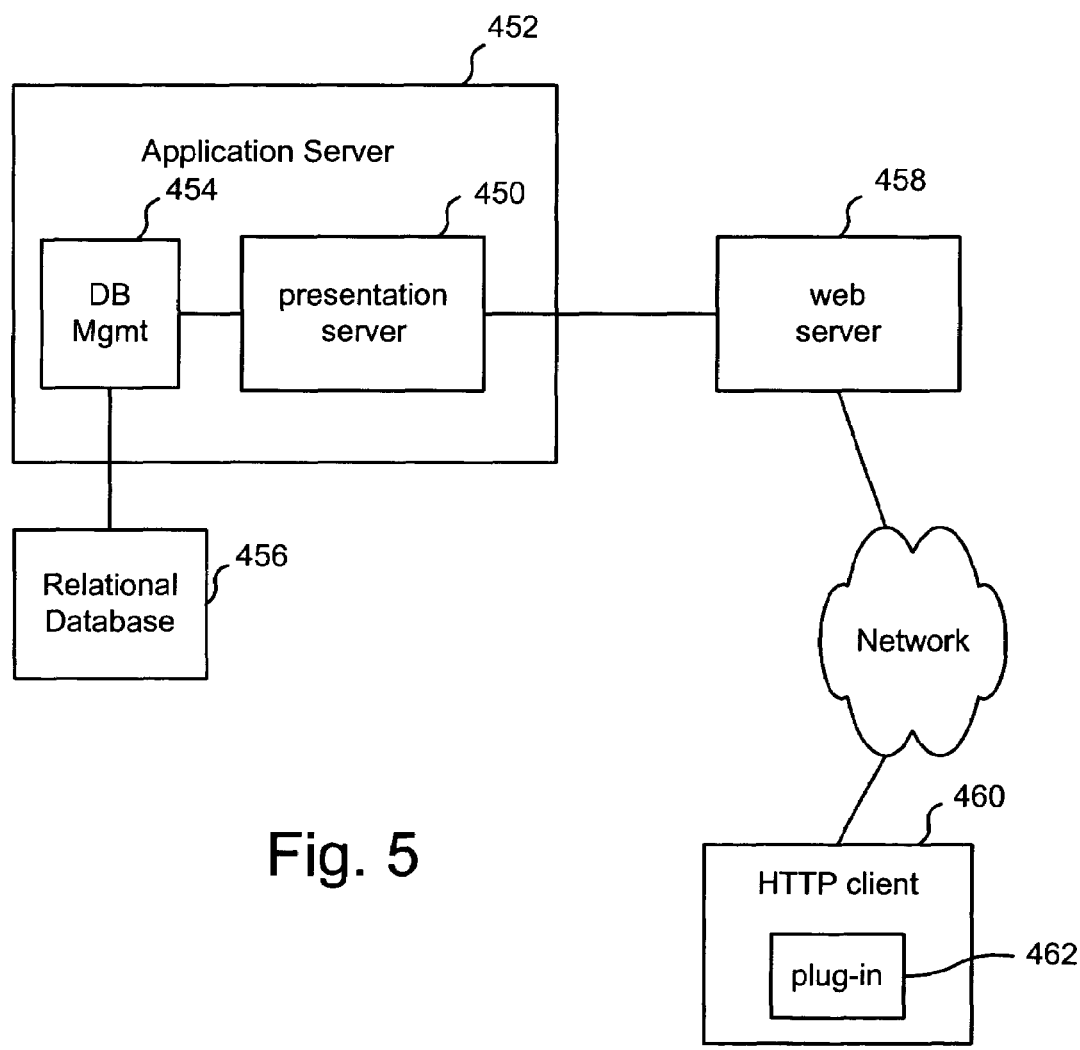
FIG. 5 is a block diagram of one embodiment of a system that provides an interface via a network.

In one embodiment, the Presentation Server generates highly optimized/compressed object code for a given Presentation Renderer. A Presentation Renderer is a software environment, hardware, set of one or more software programs, etc. that can display graphics and play sound. FIG. 5 is a block diagram providing a high-level description of one exemplar implementation of a system that includes a Presentation Server. FIG. 5 shows Presentation Server 450 implemented as a Java Servlet that compiles server located mark-up language description files and data into object code. In one embodiment, Presentation Server 450 generates object code for the Macromedia Flash Player. Presentation Server 450 can be hosted by any standard Java Servlet implementation, including Jakarta Tomcat and J2EE servers like BEA Weblogic and IBM Websphere. When hosted in a J2EE server, the presentation server takes advantage of services that are available including JDBC and JCA. FIG. 5 shows Presentation Server 450 hosted in Application Server 452. Application Server 452 also includes database management services 454, which is in communication with relational database 456. Other types of data stores, other than a relational database, can also be used. Presentation Server 450 receives requests and sends responses via Web Server 458, which is in communication with clients via a network. That network can be any standard network known in the art, including the Internet, a LAN, a WAN, etc. For example, FIG. 5 shows an HTTP client 460 (e.g., browser) with plug-in 462 (e.g., Flash Player) in communication with Presentation Server 450 via Web Server 458. In one embodiment, the client is a Macromedia Flash Player embedded in a web client as a plug-in. While the Flash Player is an appropriate vehicle for Presentation Server 450, many other presentation renderers can also be utilized.

Figure 6:
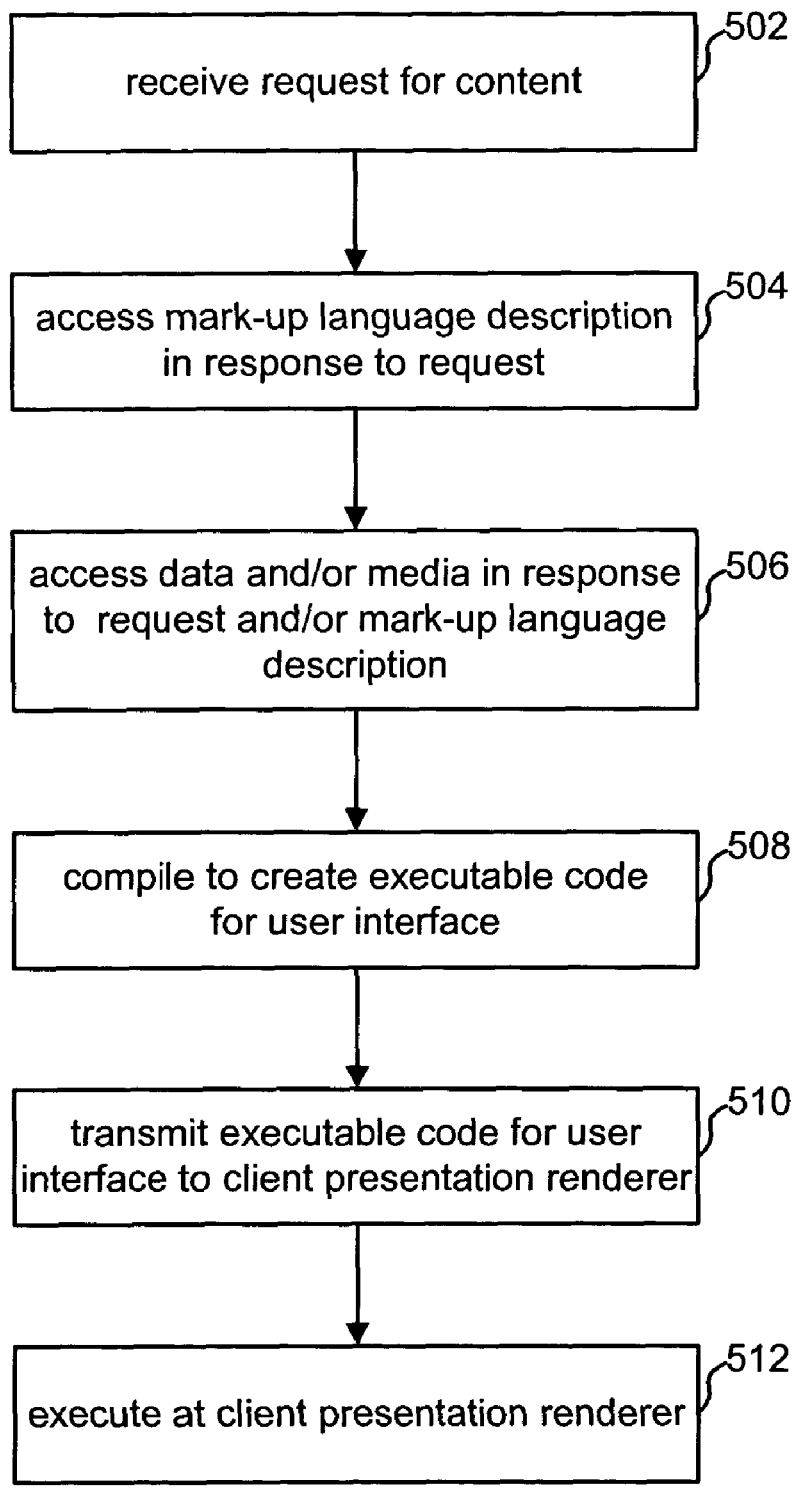
FIG. 6 is a flow chart depicting one embodiment of a process for operating the system of FIG. 5.

FIG. 6 is a flow chart describing one exemplar embodiment of the operation of the system of FIG. 5. In step 502, the Presentation Server receives a request for content. The content can be a Web page, media, data, an application, or anything else accessible via a network. In step 504, the Presentation Server accesses a mark-up language description of the content in response to the received request. In some embodiments, other languages are used. In step 506, the Presentation Server accesses any data and/or media in response to the request or in response to the mark-up language description. In some instances, the request will not require any data or media and, therefore, step 506 can be skipped. In step 508, the mark-up language description, data and/or media are complied, as described above, to create executable code for a user interface (or other application). In step 510, the executable code is transmitted to the client. In step 512, the executable code is executed at the client, as described above.

As stated above, some embodiments include the Presentation Server accessing a mark-up language description of the content requested. There are many different variations of mark-up languages that are suitable for the present invention. XML provides one example of a suitable framework for a mark-up language. More information about a system using a Presentation Server can be found in U.S. patent application Ser. No. 10/092,010, "Presentation Server" filed on Mar. 5, 2002, incorporated herein by reference in its entirety.

The above description provides examples of how to implement constraints. There are a number of other ways to implement constraints, most of which are not as advantageous as described above. First, the constrained property can be changed from type T to type ( )->T (a function of no arguments that returns a value of type T). For example, the value of view.width is a Number. The property view.width can be replaced by a function view.widthfn of type ( )-> Number, a nullary function that returns a value: view.widthfn=function ( ) {return 100;}. This also requires changing every access to the value, to call the function instead:

Typically this would be done for a property with a value that depended on other values:

```
view.widthfn=function ( ) {return this.parent.width-
    20;}
``` to define a view whose value depends on the width of the parent's view.

There are at least two problems with this approach. First, every property which might be set using this technique in any instance must be changed to a function, which requires changing the syntax of every location where it is defined and used. For example, if the parent of 'view' in the example above might also have a width that is computed using this technique. In fact, even if the parent view won't ever have a width that is changed using this technique, it would have to be changed if the same code might access either view. parent or view without knowing which one it is accessing, so that all access to the width of these views is made through the same mechanism and is therefore applicable to the most general case (the view whose width is set using this technique). This requires modifying large portions of the source code, to a syntax that is at best (in JavaScript) verbose and obfuscated.

The fact that this syntax requires extra punctuation and obscures the program logic is a first problem. The fact that the syntax for expressing and reading property values is so different depending on whether the value is constrained or not is the second problem. The third problem is that if every property value is accessed via a function call, this is expensive both in the size of the generated program and in the time spent to execute code that references property values. The various embodiments described above improve over this solution by using a nearly parallel syntax.

The other approach for implementing constraints is to use an extension of the same technique that is used to distinguish between $once and $immediately. First, the programmer must move the code that computes the constraint value into a separate function F. Then, they must place, after every statement of the source program that changes a value that is used in the constraint expression, a statement that assigns the result of a call to F to the property that F constrains. For example, above, view.width depends on the value of view. parent.width. If there is a line of code that references view.parent as the value of p, and if the view is accessible from p as parent.children[0], then the statement:

```
p.width=200;
``` should be followed by:

```
p.children[0].width=F( );
``` or:

```
F'( );
``` where F' is initialized to a function that sets the value of the property:

```
function f( ) {this.width=this.parent.width-10;}
```

In the first case, if another view (say, one accessible as view.children[0]) is constrained to the value of view.width, then the assignment should be followed by another assignment:

```
p.width=200;

p.children[0].width=F( );

p.children[0].children[0].width=F'( ); //F' computes
    the value of view.children[0].width
```

In the second case, the assignment inside of F must be appended:

```
function f( ) {this.width=this.parent.width-10;

F'( ); //F' assigns a value to view.children[0].width}
```

This is not a perfect solution for the following reasons. First, given a source text description of a value V (for example view.parent), it is difficult to discover which variables (for example p) may take on that value. Second, given a source text description of a value V (for example view. parent), an object O that contains a property that depends on it, and the expression by which O references V ("view.parent"), it is in general difficult to discover an expression by which V references O ("p.children[0]"). Such an expression may not exist. Third, a variable that references an view (V) at one time may reference other views at other times; since these views may have other or no constraints, it is incorrect to unconditionally set their properties to the constraint on the one view, and inefficient to unconditionally evaluate that view's constraint expression. Fourth, it is possible to introduce, and difficult to debug, cases of infinite recursion, where o1.b is constrained to o2.c and vice versa (or there is a longer cycle). Fifth adding a constraint, or changing an expression between a constraint expression (which is recomputed) and one that is evaluated only at once, requires extensive editing.

Various embodiments of the present invention address the above concerns in at least two ways. One is to add a mechanism for tracking which constraints need to be recomputed at which times automatically. The other is by adding a syntax for constrained expressions which is concise, and exactly parallels the syntax for non-constrained expressions, for example:

```
<view width="$once{parent.width – 10}"/>
``` defines a property that is initialized once;

```
<view width="$always{parent.width – 10}"/>
``` defines a property that is recomputed when the value that it depends on (parent.width) changes.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method to provide for evaluating code expressions, comprising:
   receiving code for a program, said code includes one or more expressions and one or more markers that specify one or more times when said one or more expressions should be evaluated during execution of said program; and
   automatically providing additional functionality to said code for said program, said additional functionality evaluates said one or more expressions during execution of said program at said one or more times specified by said one or more markers.

2. A method according to claim 1, wherein:
   said one or more markers specify when said one or more expressions should be evaluated during execution of said program independent from a context of where said expressions are used.

3. A method according to claim 1, wherein:
   said markers that specify one or more times further indicate that a particular expression should be evaluated immediately, once or always.

4. A method according to claim 3, wherein:
   failure of a marker to indicate that a particular expression should be evaluated immediately or once defaults to an indication indicating that said particular expression should be evaluated always.

5. A method according to claim 1, wherein:
   said one or more expressions are constraints for variables; and
   said step of automatically providing additional functionality to said code includes adding code that creates an object for each constraint, adds functions to said object that set said variables, and adds functions that set dependencies for said expressions.

6. A method according to claim 1, wherein:
   said code for said program is XML code.

7. A method according to claim 1, wherein:
   said step of automatically providing additional functionality to said code includes compiling said code.

8. A method according to claim 1, further comprising:
   receiving a request for content via a network;
   transmitting said code with said additional functionality to a client via said network; and
   executing said code with said additional functionality at said client.

9. One or more processor readable storage devices having processor readable code embodied on said processor readable storage devices, said processor readable code for programming one or more processors to perform a method to provide for evaluating expressions, said method comprising:
   accessing code for a program, said code includes one or more expressions and one or more markers that specify one or more times when said one or more expressions should be evaluated during execution of said program; and
   automatically providing for an evaluation of said one or more expressions during execution of said program at said one or more times specified by said one or more markers.

10. One or more processor readable storage devices according to claim 9, wherein:
    said one or more markers specify when said one or more expressions should be evaluated during execution of said program independent from a context of where said expressions are used.

11. One or more processor readable storage devices according to claim 9, wherein:
    said markers that specify one or more times further indicate that a particular expression should be evaluated immediately, once or always.

12. One or more processor readable storage devices according to claim 9, wherein:
    said step of automatically providing for an evaluation includes compiling said code.

13. A method to provide for evaluating code expressions, comprising:
    receiving code for a program, said code includes one or more expressions and one or more markers that specify one or more times when said one or more expressions should be evaluated during execution of said program; and
    evaluating said one or more expressions during execution of said program at said one or more times specified by said one or more markers.

14. A method according to claim 13, wherein:
    said one or more markers specify when said one or more expressions should be evaluated during execution of said program independent from a context of where said expressions are used.

15. A method according to claim 13, wherein:
    said markers that specify one or more times further indicate that a particular expression should be evaluated immediately, once or always.

16. A method according to claim 13, wherein:
    said code for said program is XML source code.

17. A method according to claim 13, wherein:
    said code for said program is object code.

18. A method to provide for evaluating code expressions, comprising:
    accessing code tat includes an expression defining a first variable and an indicator for said expression, said expression is dependent on a changeable item within said expression, said indicator specifies one or more times when said expression should be evaluated; and
    compiling said code, said step of compiling said code adds additional functionality to said code, said additional functionality evaluates said expression when said changeable item within said expression changes during execution based on said indicator and updates said first variable.

19. A method according to claim 18, wherein:

said expression is part of a constraint for said first variable;

said step of compiling includes creating an object for said constraint, adding a first function to said object that sets said first variable, determining dependency of said expression and adding a second function for said dependency.

20. A method according to claim 19, wherein:

said additional functionality includes code that adds said first function to an object for said first variable and code that provides a pointer to said first function to an object for said changeable item to be called by said object for said changeable item when said changeable item changes.

21. One or more processor readable storage devices having processor readable code embodied on said processor readable storage devices, said processor readable code for programming one or more processors to perform a method to provide for evaluation of expressions, said processor readable code comprising:

preexisting functionality that evaluates expressions when a dependency changes and updates a variable based on said expression;

code that accesses first code, said first code includes a first expression defining a first variable and an indicator for said expression, said first expression is dependent on a first dependency within said first expression, said indicator specifies one or more times said expression should be evaluated when said first dependency changes; and code that combines said preexisting functionality with said first code so that when said first code is executed said first variable is updated by said first expression when said first dependency within said first expression changes.

22. A method according to claim 21, wherein:

said first expression is part of a constraint for said first variable; and said code that combines said preexisting functionality with said first code creates an object for said constraint, adds a first function to said object that sets said first variable, determines dependency of said first expression and adds a second function for said dependency to said object.

23. A method according to claim 21, wherein:

said preexisting functionality includes code that adds said first function to an object for said first variable and code that provides a pointer to said first function to an object for said first dependency to be called by said object for said first dependency when said first dependency changes.

24. A method to provide for evaluating code expressions, comprising:

receiving code that includes an expression defining a first variable and an indicator for said expression, said expression is dependent on a changeable item within said expression, said indicator specifies one or more times when said expression should be evaluated; and automatically providing additional functionality to said code, said additional functionality evaluates said expression when said changeable item within said expression changes during execution based on said indicator and updates said first variable.

25. A method according to claim 24, wherein:

said expression is part of a constraint for said first variable; and said step of automatically providing includes creating an object for said constraint, adding a first function to said object that sets said first variable, determining dependency of said expression and adding a second function for said dependency to said object.

26. A method according to claim 25, wherein:

said additional functionality includes code that adds said first function to an object for said first variable and code tat provides a pointer to said first function to an object for said changeable item to be called by said object for said changeable item when said changeable item changes.

27. A method according to claim 24, further comprising:

requesting said code by an Internet client;

transmitting said code with said additional functionality to said Internet client after said step of automatically providing; and executing said code with said additional functionality using said Internet client.

28. One or more processor readable storage devices having processor readable code embodied on said processor readable storage devices, said processor readable code for programming one or more processors to perform a method to provide for evaluating expressions, said method comprising:

accessing code that includes an expression defining a first variable and an indicator for said expression, said expression is dependent on a changeable item within said expression, said indicator specifies one or more times when said expression should be evaluated; and automatically providing preexisting additional functionality to said code, said preexisting additional functionality evaluates said expression when said changeable item within said expression changes during execution based on said indicator and updates said first variable.

29. One or more processor readable storage devices according to claim 28, wherein:

said expression is part of a constraint for said first variable; and said step of automatically providing includes creating an object for said constraint, adding a first function to said object that sets said first variable, determining dependency of said expression and adding a second function for said dependency to said object.

30. One or more processor readable storage devices according to claim 29, wherein:

said additional functionality includes code that adds said first function to an object for said first variable and code that provides a pointer to said first function to an object for said changeable item to be called by said object for said changeable item when said changeable item changes.

31. One or more processor readable storage devices according to claim 28, wherein:

said preexisting additional functionality prevents circular evaluation.

32. An apparatus that provides for evaluation of code expressions, comprising:

a processor readable storage device; and one or more processors in communication with said processor readable storage device, said one or more processors perform a method comprising the steps of:

accessing code that includes an expression defining a first variable and an indicator for said expression, said expression is dependent on a changeable item within said expression, said indicator specifies one or more times when said expression should be evaluated, and automatically providing preexisting additional functionality to said code, said preexisting additional functionality evaluates said expression when said changeable item within said expression changes during execution based on said indicator and updates said first variable.

33. An apparatus according to claim 32, wherein:

said expression is part of a constraint for said first variable;

said step of automatically providing includes creating an object for said constraint, adding a first function to said object that sets said first variable, determining dependency of said expression and adding a second function for said dependency to said object; and said additional functionality includes code that adds said first function to an object for said first variable and code that provides a pointer to said first function to an object for said changeable item to be called by said object for said changeable item when said changeable item changes.

* * * * *